(12) United States Patent
Yamanaka et al.

(10) Patent No.: US 10,494,506 B2
(45) Date of Patent: Dec. 3, 2019

(54) FLAME-RETARDANT RESIN COMPOSITION AND ARTICLE MOLDED FROM SAME

(71) Applicant: TEIJIN LIMITED, Osaka (JP)

(72) Inventors: Katsuhiro Yamanaka, Osaka (JP); Tsuyoshi Takeda, Osaka (JP)

(73) Assignee: TEIJIN LIMITED, Osaka (JP)

( * ) Notice: Subject to any disclaimer, the term of this patent is extended or adjusted under 35 U.S.C. 154(b) by 197 days.

(21) Appl. No.: 15/304,721

(22) PCT Filed: Jul. 27, 2015

(86) PCT No.: PCT/JP2015/071216
§ 371 (c)(1),
(2) Date: Oct. 17, 2016

(87) PCT Pub. No.: WO2016/017571
PCT Pub. Date: Feb. 4, 2016

(65) Prior Publication Data
US 2017/0051132 A1    Feb. 23, 2017

(30) Foreign Application Priority Data

Jul. 31, 2014 (JP) .................................. 2014-156464

(51) Int. Cl.
C08K 5/5357 (2006.01)
D01F 1/07 (2006.01)
D01F 6/04 (2006.01)

(52) U.S. Cl.
CPC .............. *C08K 5/5357* (2013.01); *D01F 1/07* (2013.01); *D01F 6/04* (2013.01)

(58) Field of Classification Search
CPC .................................................. C08K 5/5357
See application file for complete search history.

(56) References Cited

U.S. PATENT DOCUMENTS

| | | | |
|---|---|---|---|
| 3,839,506 A | 10/1974 | Hechenbleikner | |
| 3,962,377 A | 6/1976 | Spivack | |
| 4,174,343 A * | 11/1979 | Hardy | C07F 9/4062 524/120 |
| 2013/0281585 A1 | 10/2013 | Yamanaka | |
| 2015/0038036 A1 | 2/2015 | Yamanaka et al. | |
| 2015/0132607 A1 | 5/2015 | Yamanaka et al. | |

FOREIGN PATENT DOCUMENTS

| | | |
|---|---|---|
| GB | 1 498 019 | 1/1987 |
| JP | 50-60481 | 5/1975 |
| JP | 50-68978 | 6/1975 |
| JP | 50-105560 | 8/1975 |
| JP | 2002-3727 | 1/2002 |
| JP | 2003-26935 | 1/2003 |
| JP | 2003-267984 | 9/2003 |
| JP | 2004-10586 | 1/2004 |
| JP | 2004-10587 | 1/2004 |
| JP | 2004-18380 | 1/2004 |
| JP | 2004-18381 | 1/2004 |
| JP | 2004-18382 | 1/2004 |
| JP | 2004-18383 | 1/2004 |
| JP | 2004083537 A * | 3/2004 |
| JP | 2004-238568 | 8/2004 |
| JP | 2009-120717 | 6/2009 |
| JP | 2009-292965 | 12/2009 |
| TW | 201412958 | 4/2014 |
| WO | 2013/147294 | 10/2013 |

OTHER PUBLICATIONS

European Search Report dated Jun. 21, 2017 in corresponding European Application No. 15827086.8.
Notification of Reasons for Refusal dated Mar. 13, 2018 in Japanese Application No. 2016-538334, with English Translation.
International Search Report dated Oct. 13, 2015 in International (PCT) Application No. PCT/JP2015/071216.

* cited by examiner

*Primary Examiner* — Wenwen Cai
(74) *Attorney, Agent, or Firm* — Wenderoth, Lind & Ponack, L.L.P.

(57) ABSTRACT

Provided is a flame-retardant polyolefin resin composition, which contains 1 to 100 parts by weight of an organic phosphorus compound (component B) represented by the following formula (1) per 100 parts by weight of the polyolefin resin (component A), realizing high flame retardancy, high heat resistance and excellent physical properties.

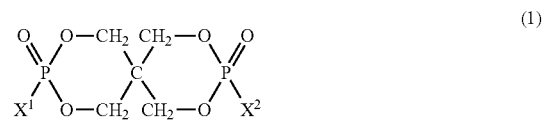

(1)

wherein $X^1$ and $X^2$, which may be the same or different, are aromatic-substituted alkyl groups, represented by the following formula (2):

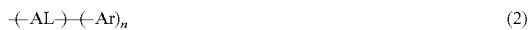

(2)

wherein AL is a branched or linear aliphatic hydrocarbon group having 1 to 5 carbon atoms, Ar is a phenyl group, a naphthyl group, or an anthryl group optionally having a substituent in an aromatic ring, n represents an integer of 1 to 3, and Ar can be bonded to any carbon atom in AL.

5 Claims, No Drawings

FLAME-RETARDANT RESIN COMPOSITION AND ARTICLE MOLDED FROM SAME

TECHNICAL FIELD

The present invention relates to a flame-retardant resin composition comprising both flame retardancy and satisfactory physical properties, and to an article molded from the composition. More specifically, the present invention relates to a flame-retardant polyolefin-based resin composition that contains a pentaerythritol diphosphonate compound having specific properties and is substantially halogen-free, and to an article molded from the composition.

BACKGROUND ART

Polyolefin-based resins find uses in a wide variety of applications because of their characteristics such as satisfactory processability, satisfactory physical properties, and low specific gravity. Polyolefin-based resins also include various resin species such as polyethylene and polypropylene so that it is possible to select physical properties suitable to each application. Polyolefin-based resins are, however, easily flammable materials, and therefore, imparting flame retardancy has been contemplated so far in various ways.

As an example for imparting flame retardancy, addition of a halogen-based flame retardant has been conventionally contemplated, but, in recent years, non-halogen-based flame retardants have been actively contemplated due to environmental problems such as emission of toxic gases on combustion. As an exemplary non-halogen-based technique for imparting flame retardancy for polyolefin-based resins, most frequently conducted is a method of adding a metal hydroxide such as magnesium hydroxide and aluminum hydroxide. Although many reports have been made on this approach for imparting flame retardancy in particular as a technique for wire-coating materials, these flame-retardant resin compositions containing magnesium hydroxide, aluminum hydroxide or the like require addition of a large amount of a flame-retardant to achieve flame-retardant performance. This has led to reduction in the physical properties of the resin composition, resulting in a problem in which characteristics inherent to the resin are not achieved, a problem in which processability, which is a feature of polyolefin-based resins, is impaired, and the like. Accordingly, although it is possible to extend application of a polyolefin-based resin composition containing a metal hydroxide into wire coating materials, it has been extremely difficult to extend the application into molded articles, fiber products and the like.

To solve such problems, a technique of imparting flame retardancy to a polyolefin-based resin by using a phosphoric acid ester-based flame-retardant has been contemplated. Phosphoric acid ester monomers, typified by triphenyl phosphate, are highly volatile, and have caused problems such as mold deposit on molding and bleeding out during use of molded articles. Accordingly, condensed phosphoric acid ester-based flame retardants have been contemplated. Unfortunately, when a condensed phosphoric acid ester-based flame retardant was used, there were problems such as an insufficient flame-retardant effect and reduced heat resistance due to the plasticizing effect of the phosphoric acid ester.

Thus, in recent years, there has been suggested an intumescent flame retardant which forms a foamed layer on the surface of a molded article during combustion by using a specific phosphate-based flame-retardant to suppress diffusion of decomposition products and heat transfer and to exert flame retardancy (PTL 1). Although having excellent flame retardancy, the intumescent flame retardant has problems such as insufficient dispersion into resin due to its secondary agglomeration, aggravated hygroscopicity due to hydrolysis and the like. Coaddition of a compound having a specific molecular structure such as phosphoric acid ester, silicone oil, polycarbodiimide or the like has made an improvement, but satisfactory characteristics have not been achieved so far (PTLs 2 to 4).

Furthermore, the aforementioned technology for imparting flame retardancy is not generally applicable to a variety of polyolefin-based resins, but can be applied only to specific resin species among polyolefin-based resins. Of these, highly heat-resistant polyolefin-based resins, typified by polymethylpentene resins, have a high processing temperature, which could not be addressed by phosphoric acid ester-based flame retardants.

CITATION LIST

Patent Literature

[PTL 1]
Japanese Unexamined Patent Application Publication No. 2003-26935
[PTL 2]
Japanese Unexamined Patent Application Publication No. 2004-238568
[PTL 3]
Japanese Unexamined Patent Application Publication No. 2009-120717
[PTL 4]
Japanese Unexamined Patent Application Publication No. 2009-292965

SUMMARY OF INVENTION

Technical Problem

An object of the present invention is to provide a flame-retardant resin composition which has high flame retardancy and satisfactory physical properties and especially has no decrease in its heat resistance, and a product therefrom.

Solution to Problem

The present inventors have conducted intensive studies to solve the problems and have found that it is possible to provide a polyolefin resin composition, which enables realization of both high flame retardancy and excellent physical properties, by preparing the polyolefin resin (component A) containing 1 to 100 parts by weight of an organic phosphorus compound (component B) represented by the following formula (1) per 100 parts by weight of the component A, wherein the organic phosphorus compound has an organic purity of 97.0% or more, a chlorine content of 1000 ppm or less, $\Delta$pH of 1.0 or less, and a content of the residual solvent of 1000 ppm or less:

[Chem. 1]

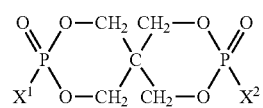

(1)

wherein $X^1$ and $X^2$, which may be the same or different, are aromatic-substituted alkyl groups, represented by the following formula (2):

[Chem. 2]

(2)

wherein AL is a branched or linear aliphatic hydrocarbon group having 1 to 5 carbon atoms, Ar is a phenyl group, a naphthyl group, or an anthryl group optionally having a substituent in an aromatic ring, n represents an integer of 1 to 3, and Ar can be bonded to any carbon atom in AL.

Advantageous Effects of Invention

According to the present invention, it is possible to provide a flame-retardant polyolefin-based resin composition which is substantially halogen-free, has high flame retardancy and satisfactory physical properties, and especially has no decrease in its heat resistance.

DESCRIPTION OF EMBODIMENTS

The flame-retardant resin composition of the present invention is explained in detail as follows.
(Polyolefin Resin (Component A))

Polyolefin resins used as component A in the present invention include, though not limited particularly, following examples: homopolymers of ethylene, propylene, 1-butene and the like; copolymers among them; copolymers of them with other α-olefins having about 2 to 20 carbon atoms such as 3-methyl-1-butene, 1-pentene, 4-methyl-1-pentene, 1-hexene, 1-octene, 1-decene and the like, vinyl acetate, vinyl alcohol, acrylic acid, methacrylic acid, acrylate, methacrylate and the like.

Examples of polyolefin resins include specifically polyethylene-based resins such as ethylene homopolymers such as low, middle and high density polyethylenes (branched or straight) and the like, ethylene/propylene copolymer, ethylene/1-butene copolymer, ethylene/4-methyl-1-pentene copolymer, ethylene/1-hexene copolymer, ethylene/1-octene copolymer, ethylene/vinyl alcohol copolymer, ethylene/acrylic acid copolymer, ethylene/methacrylic acid copolymer; polypropylene-based resins such as propylene homopolymer, propylene/ethylene copolymer, propylene/ethylene/1-butene copolymer and the like; poly(1-butene)-based resins such as 1-butene homopolymer, 1-butene/ethylene copolymer, 1-butene/propylene copolymer and the like.

The polyolefin resins may be modified by unsaturated carboxylic acids such as maleic anhydride, maleic acid, acrylic acid and the like or derivatives thereof, an unsaturated silane compound or the like. Besides, it may have partial cross-linked structure.

Here, the polyethylene-based resin is a polymer containing ethylene as a primary component as a raw material monomer, and preferably containing 50% by weight or more of ethylene. Also, the polypropylene-based resin is a polymer containing propylene as a primary component as a raw material monomer, and preferably containing 50% by weight or more of propylene. Similarly, the poly(1-butene)-based resin is a polymer containing 1-butene as a primary component as a raw material monomer, and preferably containing 50% by weight or more of 1-butene.

When a copolymer is used as polyolefin resin, the polymerization pattern is not limited and may be any of block copolymer, random copolymer, graft copolymer and the like. Also, a well-known catalyst may be used appropriately for a polymerization process and polymerization.

These polyolefin resins may be used singly or as a mixture of two kinds or more. As a good example of polyolefin resin application, a resin component preferably contains 60% by weight or more of at least one kind of resin chosen among polyethylene-based resin, polypropylene-based resin, poly(1-butene)-based resin and poly(4-methyl-1-pentene)-based resin.

As a good example of the polyethylene resin in the present invention, a suitable resin preferably has a melt flow rate, measured at 190° C. and under the 2.16-kg load according to JIS K7210, of 50 g/10 min or less, more preferably 30 g/10 min or less, and further preferably 25 g/10 min. When the resin having a melt flow rate over 50 g/10 min is used for molding, it may cause many droppings during combustion of the molded article, and desired flame retardancy may not be attained.

As a good example of the polypropylene resin in the present invention, a suitable resin preferably has a melt flow rate, measured at 230° C. and under the 2.16-kg load according to JIS K7210, of 0.1 to 50 g/10 min, more preferably 0.2 to 45 g/10 min, further preferably 0.3 to 40 g/10 min, and particularly preferably 10 to 35 g/10 min. When the resin having a melt flow rate over 50 g/10 min is used for molding, it may cause many droppings during combustion of the molded article, and desired flame retardancy may not be attained.

As a good example of the poly(1-butene)-based resin in the present invention, a suitable resin preferably has a melt flow rate, measured at 190° C. and under the 2.16-kg load according to JIS K7210, of 20 g/10 min or less, more preferably 15 g/10 min or less, and further preferably 10 g/10 min or less.

As a good example of the poly(4-methyl-1-pentene)-based resin in the present invention, a suitable resin preferably has a melt flow rate, measured at 260° C. and under the 5.0-kg load according to JIS K7210, of 1 to 200 g/10 min, more preferably 5 to 180 g/10 min, further preferably 5 to 150 g/10 min, and particularly preferably 7 to 50 g/10 min.

A polyolefin resin of component A may contain, as needed, other thermoplastic resins (polycarbonate resin, polyarylate resin, polyamide resin, polyimide resin, polyetherimide resin, polyurethane resin, silicone resin, polyphenylene sulfide resin, polysulfone resin, polystyrene resin, acrylonitrile/styrene copolymer (AS resin), acrylonitrile/butadiene/styrene copolymer (ABS resin), polystyrene resin, high-impact polystyrene resin, syndiotactic polystyrene resin, polymethacrylate resin, phenoxy or epoxy resin, and the like).
(Organic Phosphorus Compound (Component B))

An organic phosphorus compound used as component B in the present invention is an organic phosphorus compound represented by the following formula (1).

[Chem. 3]

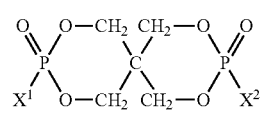
(1)

wherein $X^1$ and $X^2$, which may be the same or different, are aromatic-substituted alkyl groups, represented by the following formula (2):

[Chem. 4]

(2)

wherein AL is a branched or linear aliphatic hydrocarbon group having 1 to 5 carbon atoms, Ar is a phenyl group, a naphthyl group, or an anthryl group optionally having a substituent in an aromatic ring, n represents an integer of 1 to 3, and Ar can be bonded to any carbon atom in AL.

It is preferably an organic phosphorus compound represented by the following formula (3).

[Chem. 5]

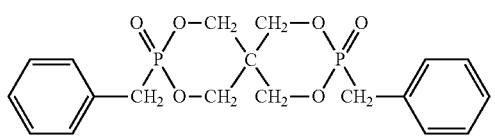
(3)

The organic phosphorus compound represented by the formula (1) (component B) exhibits an extremely excellent flame retardant effect on the resin. As far as the present inventors know, conventionally, in halogen-free technique for imparting flame retardancy to the resin, imparting flame retardancy by use of a small amount of a flame retardant was difficult and indeed, had a lot of practical problems.

According to the present invention, however, the organic phosphorus compound (component B) surprisingly achieves flame retardancy of the resin with ease when used singly in a small amount without impairing characteristics inherent to the resin.

In the present invention, it is naturally possible to blend a phosphorus compound other than the component B, a fluorine-containing resin, or other additives in addition to the component B in order to reduce the proportion of the component B to be used, to improve the flame retardancy of a molded article, to improve the physical properties of the molded article, to enhance the chemical properties of the molded article, or for other purposes.

Subsequently, a method for synthesizing the organic phosphorus compound in the present invention (component B) will be described. The component B may be one produced by a method other than the method described hereinbelow.

The component B can be obtained by subjecting, for example, pentaerythritol to the reaction with phosphorus trichloride, subsequently treating the oxidized reactant with an alkali metal compound such as sodium methoxide, and then, subjecting an aralkyl halide to the reaction with the reaction product.

The component B can be obtained also by a method of subjecting pentaerythritol to the reaction with an aralkyl phosphonic dichloride or a method of subjecting an aralkyl alcohol to the reaction with a compound obtained by reacting pentaerythritol with phosphorus trichloride and subsequently conducting the Arbuzov rearrangement at a high temperature. The latter reaction is disclosed in, for example, U.S. Pat. No. 3,141,032, Japanese Unexamined Patent Application Publication No. 54-157156, and Japanese Unexamined Patent Application Publication No. 53-39698.

A specific method for synthesizing the component B will be described hereinbelow. This synthesis method is intended for illustration purposes only, and the component B used in the present invention may be synthesized not only by the synthesis method to be described but also by its modification and other synthesis methods. A more specific synthesis method will be described in the preparation examples below.

(Method for Synthesizing Organic Phosphorus Compound of Above Formula (3) in Component B)

The organic phosphorus compound is obtained by subjecting pentaerythritol to the reaction with phosphorus trichloride and then the reaction product is oxidized by tertiary butanol. The resulting product is treated with sodium methoxide, followed by the reaction with benzyl bromide.

In an alternative method, pentaerythritol is subjected to the reaction with phosphorus trichloride to form a reaction product. The organic phosphorus compound is obtained by subjecting a reaction product obtained by the reaction of the formed reaction product with benzyl alcohol to a heat treatment in the presence of a catalyst.

The aforementioned organic phosphorus compound (component B) to be used has an organic purity measured with HPLC of preferably 97.0% or more, more preferably 98.0% or more, and still more preferably 99.0% or more. Use of the component B having an organic purity within this range enables both high flame retardancy and satisfactory physical properties. The organic purity particularly affects the flame retardancy of the resin composition obtained. When the organic purity is low, high flame retardancy cannot be achieved. Furthermore, when the component B has a low organic purity, deterioration of the hue, reduction in the physical properties, and particularly reduction in the heat resistance of the resin composition obtained are exhibited due to the influences of impurities.

The organic purity of the component B herein can be measured effectively with HPLC by use of the following method.

The column used was Develosil ODS-7 300 mm×4 mmϕ manufactured by Nomura Chemical Co., Ltd., and the column temperature was set to 40° C. The solvent used was a 6:4 (volume ratio) mixed solution of acetonitrile and water, and 5 μL of the solution was injected. Detection was performed by measuring absorption at UV-264 nm.

The method of removing impurities contained in the component B is not particularly limited but a method in which repulp cleaning (cleaning with a solvent and filtration are repeated several times) is carried out with a solvent such as water, methanol or the like is the most effective and economically advantageous. Stirring a mixture of the component B and a solvent under heating during cleaning can achieve more effective cleaning.

The component B that can be suitably used has a chlorine content of preferably 1000 ppm or less, more preferably 500 ppm or less, and still more preferably 100 ppm or less. Since providing a non-halogen flame-retardant resin composition is included as an object of the present invention, the component B having a chlorine content within this range is preferably used. By using the component B having a chlorine content within this range, a molded article having satisfactory thermal stability can be provided as well as a molded article having an excellent hue. When the chlorine content exceeds this range, the thermal stability of the resin composition is reduced, and decrease in the hue is exhibited due to occurrence of scorching during high temperature molding.

The chlorine content of the component B can be effectively measured by conducting analysis by a combustion method and detection by a titration method in compliance with ASTM D5808.

The component B that can be suitably used has ΔpH of preferably 1.0 or less, more preferably 0.8 or less, still more preferably 0.5 or less, and particularly preferably 0.3 or less.

By using the component B having ΔpH within this range, a molded article having satisfactory thermal stability can be provided and a molded article having an excellent hue can be provided. When ΔpH exceeds the range, the thermal stability of the resin composition is reduced, and decrease in the hue is exhibited due to occurrence of scorching during high temperature molding.

ΔpH of the component B can be measured efficiently with HPLC by use of the following method.

A mixture prepared by mixing 99 g of distilled water and 1 g of a dispersant, and its pH after one minute of stirring is measured using a pH meter (the resulting pH value is taken as pH1).

To the mixed solution of the distilled water and the dispersant, 1 g of the organic phosphorus compound of the component B is added and the resultant mixture is stirred for one minute. The mixture after stirring is filtered, and the filtrate is measured for the pH using a pH meter (the resulting pH value is taken as pH2). The ΔpH of the present invention can be calculated by the following formula (4).

$$\Delta pH = |pH1 - pH2| \quad (4)$$

Additionally, the component B that can be suitably used has a content of the residual solvent of preferably 1000 ppm or less, more preferably 800 ppm or less, still more preferably 500 ppm or less, and particularly preferably 100 ppm or less. By using the component B having the content of the residual solvent within this range, a resin composition having high flame retardancy can be provided. A polyolefin-based resin generally has low flame retardancy, and thus, it may become difficult to achieve desired flame retardancy when the content of the residual solvent exceeds this range.

The content of the residual solvent of the component B can be measured effectively using HPLC in the same manner as the method for measuring the organic purity.

The component B is blended in the range of 1 to 100 parts by weight, preferably 5 to 90 parts by weight, more preferably 10 to 70 parts by weight, and still more preferably 10 to 50 parts by weight per 100 parts by weight of the polyolefin-based resin (component A). The suitable range for the proportion of the component B to be blended depends on a desired flame retardancy level, the type of the polyolefin-based resin (component A) and the like. Other components besides the components A and B constituting these compositions may be used as required as long as the object of the present invention is not impaired. It is also possible to change the amount of the component B to be blended by using other flame retardants, flame-retardant aids, and fluorine-containing resins. In many cases, it is possible to reduce the proportion of the component B to be blended by using such components.

To the flame-retardant resin composition of the present invention, an antioxidant, a stabilizer such as a thermal stabilizer and a photostabilizer, a nucleating agent, an inorganic filler, an organic filler, an impact reducing agent, an ultraviolet absorbent, a releasing agent, a lubricant, a foaming agent, a flowability improving agent, a colorant, an antistatic agent, an antimicrobial agent, a photocatalyst-based antifouling agent, an infrared absorbent and the like may be blended as long as the object of the present invention is not impaired. These various additives can be used in a known amount to be added.

For preparation of the flame-retardant resin composition of the present invention, there is preferably adopted a method in which a polyolefin-based resin (component A), an organic phosphorus compound (component B), and other components as required are premixed by using a mixer such as a V type blender, a super mixer, a super floater, a Henschel mixer and the like, and the resulting premixed mixture is fed into a kneader and melt kneaded. As a kneader, various melt mixers such as a kneader, a single-screw or twin-screw extruder, and the like can be used. Especially, preferably used is a method in which a resin composition is melted at a recommended temperature corresponding to various polyolefin-based resins by using a twin-screw extruder, a liquid component is injected from a side feeder, and the whole mixture is extruded, and pelletized using a pelletizer.

Examples of a process for molding a molded article include, though not particularly limited to, injection molding, blow molding, press molding and the like. Preferably, a pellet resin composition is injection molded by using an injection molding machine.

Examples of a process for spinning fiber include, though not particularly limited to, melt spinning, dry spinning, wet spinning and the like. As for a polyolefin-based resin, in general, the melt spinning method is suitably used.

The process for producing non-woven fabric is not particularly limited. Non-woven fabric can be produced in general by forming fleece by a fleece formation method such as a dry method, a wet method, a spun bonding method, a melt blow method and the like, and then bonding the fleece by a fleece bonding method such as a thermal bonding method, a chemical bonding method, a needle punching method, a spun lace method, a stitch bonding method, a steam jet method and the like. As for a polyolefin-based resin, generally, the spun bonding method or the thermal bonding method is suitably used.

EXAMPLES

The present invention is explained in the Examples, while the technical scope of the invention is not limited to these. In addition, "%" in Examples means "% by weight" unless otherwise specified, and the evaluation was performed using the following method.

(1) Organic Purity

The column used was Develosil ODS-7 300 mm×4 mm φ, manufactured by Nomura chemical Co., Ltd., and the column temperature was set to 40° C. The solvent used was a 6:4 (volume ratio) mixed solution of acetonitrile and water, and 5 μL of the solution was injected. Detection was performed by measuring absorption at UV-264 nm. An area ratio was calculated from the measurement result and regarded as the organic purity.

(2) Chlorine Content

According to ASTM D5808, an analysis was performed by a combustion method, and detection was performed by a titration method.

(3) ΔpH

A mixture prepared by mixing 99 g of distilled water and 1 g of a dispersant (ethanol) was stirred for 1 minute. After stirring, the pH of the mixture is measured using a pH meter (the resulting pH value is taken as pH1).

To the mixed solution of the distilled water and the dispersant, 1 g of the organic phosphorus compound of the component B is added and the resultant mixture is stirred for one minute. The mixture after stirring is filtered, and the filtrate is measured for the pH using a pH meter (the resulting pH value is taken as pH2). The ΔpH of the present invention was calculated by the following formula (4).

$$\Delta pH = |pH1 - pH2| \quad (4)$$

(4) Quantity of Residual Solvent

The column used was Develosil ODS-7 300 mm×4 mm φ, manufactured by Nomura chemical Co., Ltd., and the column temperature was set to 40° C. The solvent used was a 6:4 (volume ratio) mixed solution of acetonitrile and water, and 5 µL of the solution was injected. Detection was performed by measuring absorption at UV-264 nm. Quantity of residual solvent was calculated using a calibration curve made separately.

(5) Oxygen Index

Evaluation was performed according to JIS-K-7201. Higher index value means superior flame retardancy.

(6) Hue

A 2 mm thick molded article was prepared by injection molding, and was visually inspected according to the following standard.
○: A satisfactory hue is exhibited
Δ: Slight scorching is observed
x: Obvious scorching is observed (7) Heat Resistance Retention Ratio (Heat Deflection Temperature Retention Ratio; HDT Retention Ratio)

A 6.35 mm (¼ inch) specimen was used to measure the heat deflection temperature (HDT) under a load of 0.45 MPa by a method in compliance with ASTM-D648. Additionally, the heat deflection temperature retention ratio (M) was determined by measuring x (° C.): the heat deflection temperature of a molded article from the base resin used (component A) and y (° C.): the heat deflection temperature of a molded article from the flame-retardant resin composition (a mixture of the base resin and the component B), and calculating the ratio according to the calculation equation: M=(y/x)×100(%).

Preparation Example 1

Preparation of 2,4,8,10-tetraoxa-3,9-diphosphaspiro [5.5]undecane 3,9-dibenzyl-3,9-dioxide (FR-1)

To a reaction vessel equipped with a stirrer, a thermometer, and a condenser, 22.55 g (0.055 mol) of 3,9-dibenzyloxy-2,4,8,10-tetraoxa-3,9-diphosphaspiro[5.5]undecane, 19.01 g (0.11 mol) of benzyl bromide, and 33.54 g (0.32 mol) of xylene were charged. With stirring at room temperature, dry nitrogen was allowed to flow. Then, heating was started with an oil bath, and the mixture was heated and stirred at the reflux temperature (about 130° C.) for four hours. After the heating was completed, the mixture was left to cool to room temperature. After addition of 20 mL of xylene, the mixture was further stirred for 30 min. The precipitated crystals were separated by filtration and washed with 40 mL of xylene twice. The crude purified product obtained and 50 mL of methanol were placed in a reaction vessel equipped with a condenser and a stirrer and the mixture was refluxed for about three hours. After cooled to room temperature, the crystals were separated by filtration and washed with 20 mL of methanol twice. Then, the filtered product obtained was dried at 120° C. under a pressure of 1.33×10$^2$ Pa for 20 hours to obtain white scale-like crystals. The crystals were confirmed to be bisbenzylpentaerythritol diphosphonate by mass spectrometry analysis, $^1$H and $^{31}$P nuclear magnetic resonance spectroscopy analysis and elemental analysis. The product amount was 19.76 g, the yield was 88%, and the $^{31}$P NMR purity was 99%. Additionally, the organic purity measured by the method described herein was 99.5%. The chlorine content was 51 ppm. The ΔpH was 0.1. The content of the residual solvent was 47 ppm.

Preparation Example 2

Preparation of 2,4,8,10-tetraoxa-3,9-diphosphaspiro [5.5]undecane 3,9-dibenzyl-3,9-dioxide (FR-2)

Preparation was performed by a preparation method similar to Preparation Example 1 except that the operation of washing twice with 40 ml of xylene and reflux washing with methanol was omitted.

The product amount was 21.33 g, the yield was 95%, and the $^{31}$PNMR purity was 95%. In addition, the organic purity measured by the method described herein was 94%. The chlorine content was 2,500 ppm. The ΔpH was 1.5. The content of the residual solvent was 1,100 ppm.

The following components were used for each Examples and Comparative Examples.

(A) Polyolefin Resin (Component A)

(i) A commercial polypropylene resin (Prime Polypro J106G manufactured by Prime Polymer Co., Ltd., melt flow rate of 15.4 g/10 min (230° C., 2.16-kg load)) (hereinafter referred to as PP-1) was used.

(ii) A commercial polypropylene resin (Prime Polypro J707G manufactured by Prime Polymer Co., Ltd., melt flow rate of 31.3 g/10 min (230° C., 2.16-kg load)) (hereinafter referred to as PP-2) was used.

(iii) A commercial poly(4-methyl-1-pentene) resin (TPX DX845 manufactured by Mitsui Chemicals, Inc., melt flow rate of 9.6 g/10 min (260° C., 5.0-kg load)) (hereinafter referred to as TPX-1) was used.

(iv) A commercial poly(4-methyl-1-pentene) resin (TPX MX004 manufactured by Mitsui Chemicals, Inc., melt flow rate of 26.7 g/10 min (260° C., 5.0-kg load)) (hereinafter referred to as TPX-2) was used.

(B) Organic Phosphorus Compound (Component B)

(i) An organic phosphorus compound represented by above general formula (3), synthesized in Preparation Example 1 (hereinafter referred to as FR-1): 2,4,8,10-tetraoxa-3,9-diphosphaspiro[5,5]undecane 3,9-dibenzyl-3,9-dioxide (ii) An organic phosphorus compound represented by above general formula (3), synthesized in Preparation Example 2 (hereinafter referred to as FR-2): 2,4,8,10-tetraoxa-3,9-diphosphaspiro[5,5]undecane 3,9-dibenzyl-3,9-dioxide (C) Other Organic Phosphorus Compounds A commercial aromatic phosphoric acid ester-based flame-retardant (PX-200 manufactured by DAIHACHI CHEMICAL INDUSTRY CO., LTD.) (hereinafter referred to as FR-3) was used.

Examples 1 to 8 and Comparative Examples 1 to 14

The components each described in Tables 1 and 2 were blended in the amounts described in Tables 1 and 2 (parts by weight) in a tumbler. The blend was pelletized using a 15 mmφ twin-screw extruder (KZW15 manufactured by TECHNOVEL CORPORATION). The pellets obtained were formed into specimens using an injection molding machine (J75Si manufactured by The Japan Steel Works, Ltd.). The results of evaluation on these specimens are shown in Tables 1 and 2.

TABLE 1

|  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Composition | Component A | Type | PP-1 | PP-1 | PP-2 | PP-2 | TPX-1 | TPX-1 | TPX-2 | TPX-2 |
|  |  | Parts by weight | 100 | 100 | 100 | 100 | 100 | 100 | 100 | 100 |
|  | Component B | Type | FR-1 | FR-1 | FR-1 | FR-1 | FR-1 | FR-1 | FR-1 | FR-1 |
|  |  | Parts by weight | 10 | 20 | 10 | 20 | 10 | 20 | 10 | 20 |
| Flame retardancy | LOI | % | 20.5 | 21.4 | 20.3 | 21.5 | 21.8 | 22.7 | 21.9 | 22.6 |
| Physical property | HDT | °C. | 102 | 100 | 85 | 86 | 130 | 132 | 104 | 104 |
|  | HDT retention rate | % | 101 | 99 | 99 | 100 | 99 | 101 | 99 | 99 |
|  | Hue | Judgement | ○ | ○ | ○ | ○ | ○ | ○ | ○ | ○ |

Ex.: Example

TABLE 2

|  |  |  | Comp. ex. 1 | Comp. ex. 2 | Comp. ex. 3 | Comp. ex. 4 | Comp. ex. 5 | Comp. ex. 6 | Comp. ex. 7 |
|---|---|---|---|---|---|---|---|---|---|
| Composition | Component A | Type | PP-1 | PP-2 | TPX-1 | TPX-2 | PP-1 | PP-1 | PP-1 |
|  |  | Parts by weight | 100 | 100 | 100 | 100 | 100 | 100 | 100 |
|  | Component B | Type | — | — | — | — | FR-2 | FR-2 | FR-3 |
|  |  | Parts by weight | — | — | — | — | 10 | 20 | 20 |
| Flame retardancy | LOI | % | 17.7 | 17.5 | 17.9 | 17.8 | 19.6 | 19.9 | 17.5 |
| Physical property | HDT | °C. | 101 | 86 | 131 | 105 | 96 | 94 | 86 |
|  | HDT retention rate | % | — | — | — | — | 95 | 93 | 85 |
|  | Hue | Judgement | ○ | ○ | ○ | ○ | Δ | Δ | x |

|  |  |  | Comp. ex. 8 | Comp. ex. 9 | Comp. ex. 10 | Comp. ex. 11 | Comp. ex. 12 | Comp. ex. 13 | Comp. ex. 14 |
|---|---|---|---|---|---|---|---|---|---|
| Composition | Component A | Type | PP-2 | PP-2 | TPX-1 | TPX-1 | TPX-1 | TPX-2 | TPX-2 |
|  |  | Parts by weight | 100 | 100 | 100 | 100 | 100 | 100 | 100 |
|  | Component B | Type | FR-2 | FR-3 | FR-2 | FR-2 | FR-3 | FR-2 | FR-3 |
|  |  | Parts by weight | 20 | 20 | 10 | 20 | 20 | 20 | 20 |
| Flame retardancy | LOI | % | 18.8 | 17.1 | 21.0 | 21.8 | not moldable | 21.7 | not moldable |
| Physical property | HDT | °C. | 80 | 71 | 128 | 126 | not moldable | 99 | not moldable |
|  | HDT retention rate | % | 93 | 83 | 98 | 96 | — | 94 | — |
|  | Hue | Judgement | Δ | x | x | x | not moldable | x | not moldable |

Comp. ex.: Comprative example

INDUSTRIAL APPLICABILITY

The present invention provides a flame-retardant polyolefin-based resin composition which is substantially halogen-free, has high flame retardancy and satisfactory physical properties, and especially has no decrease in its heat resistance. The present resin composition is useful as various molded articles and materials for fiber and non-woven fabric, and extremely industrially useful.

The invention claimed is:
1. A flame-retardant resin composition comprising:
a polypropylene resin having a melt flow rate of 15.4 to 31.3 g/10 minutes measured at 230° C. and under a load of 2.16 kg in compliance with JIS K7210 standard (a component A), and

10 to 20 parts by weight of an organic phosphorus compound (a component B) represented by the following formula (3) per 100 parts by weight of the component A, wherein the organic phosphorus compound has an organic purity of 97.0% or more, a chlorine content of 1000 ppm or less, a ΔpH of 1.0 or less, and a content of a residual solvent of 1000 ppm or less:

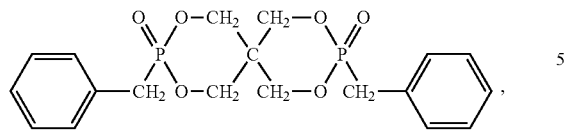

(3)

and wherein ΔpH is calculated from the following formula (4):

$$\Delta pH = |pH1 - pH2| \quad (4),$$

wherein pH1 is a first measured pH of a first mixture prepared by mixing 99 g of distilled water and 1 g of a dispersant and stirred for one minute, and pH2 is a second measured pH of a second mixture, wherein the second mixture is a mixture of the first mixture further mixed with 1 g of the organic phosphorus compound of the component B and stirred for one minute.

2. The flame-retardant resin composition according to claim 1, wherein the organic phosphorus compound (the component B) has an organic purity of 98.0% or more, a chlorine content of 500 ppm or less, a ΔpH of 0.8 or less, and a content of the residual solvent of 800 ppm or less.

3. A molded article formed from the flame-retardant resin composition according to claim 1.

4. A fiber or a fiber product obtained by spinning the flame-retardant resin composition according to claim 1.

5. A non-woven fabric obtained from the flame-retardant resin composition according to claim 1.

* * * * *